F. MATSUI.
FINDER FOR CAMERAS.
APPLICATION FILED APR. 12, 1918.
1,281,047.
Patented Oct. 8, 1918.
2 SHEETS—SHEET 1.
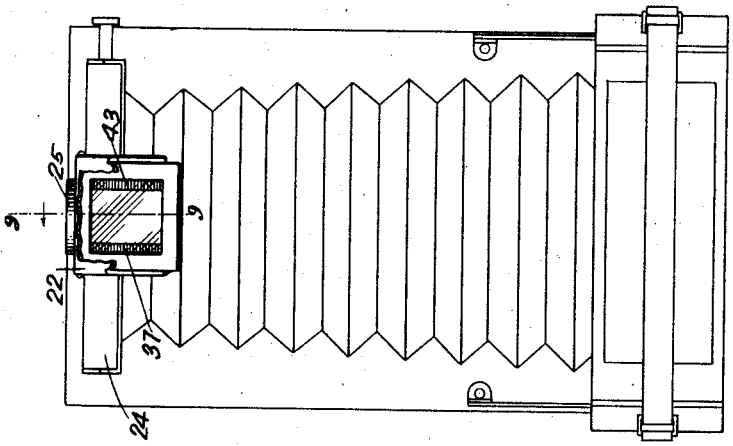
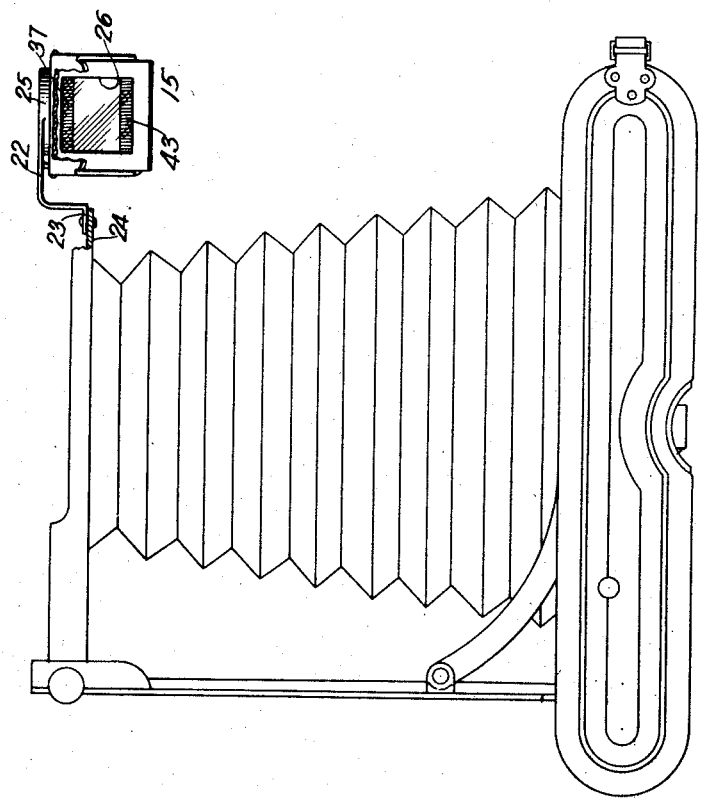
WITNESSES
Oliver W. Holmes
Geo. L. Beeler
INVENTOR
Fuzio Matsui
BY
ATTORNEYS

F. MATSUI.
FINDER FOR CAMERAS.
APPLICATION FILED APR. 12, 1918.

1,281,047.

Patented Oct. 8, 1918.
2 SHEETS—SHEET 2.

WITNESSES

INVENTOR
Fuzio Matsui
BY
ATTORNEYS

UNITED STATES PATENT OFFICE.

FUZIO MATSUI, OF NEW YORK, N. Y.

FINDER FOR CAMERAS.

1,281,047.  Specification of Letters Patent.  Patented Oct. 8, 1918.

Application filed April 12, 1918. Serial No. 228,165.

*To all whom it may concern:*

Be it known that I, FUZIO MATSUI, a subject of the Emperor of Japan, and a resident of the city of New York, borough of Manhattan, in the county and State of New York, have invented a new and Improved Finder for Cameras, of which the following is a full, clear, and exact description.

This invention relates to photographic cameras of the type in which plates or films are employed to receive the negative impression to produce an oblong picture having its longer axis either horizontal or vertical, and having associated with the camera a miniature camera or finder so arranged as to indicate to the observer or operator a view proportional in width and height to the desired picture irrespective of whether the camera is arranged for a horizontal or an upright picture.

Among the objects of the invention, therefore, is to produce a finder for a camera and having means for attaching it to the camera so that when the camera is held or supported to produce a horizontal picture or one with the longer axis horizontal and the finder is held thereon with the ground glass window upward the minature view in the finder will be proportional in dimensions and direction to the view or picture to be made on the negative, and likewise so arranged that when the camera is held or supported for a picture having its longer axis vertical and the finder is adjusted accordingly the field in the finder will be proportioned automatically with such adjustment to correspond to the upright picture.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of a conventional type of foldable camera held or supported for the taking of a picture having its longer axis horizontal and indicating the finder with its field arranged horizontally.

Fig. 2 is a plan view of the same camera arranged for a vertical picture and indicating the finder similarly disposed.

Figure 3:
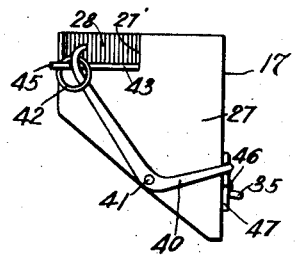
Fig. 3 is a side elevation of the inner shell portion of the finder with the movable parts in the position as they would be seen looking toward the left in Fig. 2.
Figure 4:
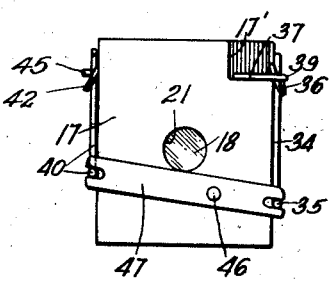
Fig. 4 is a front elevation with the parts in the same position as in Fig. 3.
Figure 5:
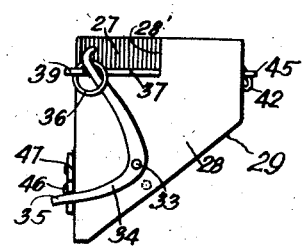
Fig. 5 is an elevation of the opposite side from Fig. 3.
Figure 6:
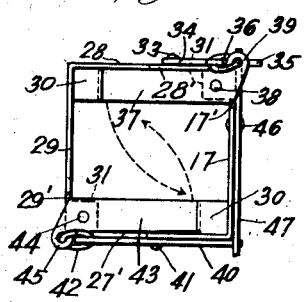
Fig. 6 is a plan view corresponding to Fig. 3.
Figure 7:
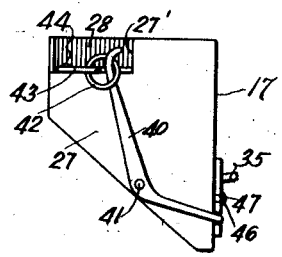
Fig. 7 is an elevation of the same character as Fig. 3, but with the parts in changed position or as they are located in Fig. 1.

Referring now more particularly to the drawings I show my improvement as relating to a finder 15 having a flanged head 16 extending from its front wall 17 in which is fitted the lens 18 through which the scene is projected upon the inclined mirror 19 and thrown upward against the ground glass window 20 for the usual or well known purpose, the light being transmitted through the hollow center 21 of the head 16. 22 indicates a bracket fixed at 23 to a portion of the front frame 24 of the camera. The bracket 22 thus is held in fixed position with respect to the camera as a whole, the head 16, however, being swiveled in the free end or hub portion 25 of the bracket so as to occupy either position of Fig. 1 or Fig. 2 with respect to the camera and finder support.

As shown in Figs. 1 and 2 the opening 26 in the top of the inner frame of the finder is ordinarily square, and except for the automatically movable devices described below, the image of the subject or scene to be photographed is thrown upon the ground glass window and so is visible throughout this square field. It will thus be appreciated unless some means is provided to proportion the field of the finder to the field of the plate or film that there is the danger that the operator relying upon the view in the finder will fail to obtain in the finished picture all of the details that may occur at the top or the bottom of the picture. In making a picture of the horizontal type as indicated in Fig. 1 and likewise when the camera is adjusted for an upright picture as shown in Fig. 2 there is danger that some detail visible in the square opening of the finder will not appear on the sides of the picture when finished. Therefore, there have been various attempts made to vary the visible field of the finder to correspond to the field within the camera so that the operator will not be misled at the time he is taking his observation at the finder.

With reference now to Figs. 3 to 6 I provide a finder comprising a frame having a square formation in plan view, this frame including the front wall 17 to which the lens 18 is attached, right and left side walls 27 and 28, and a rear or bottom wall 29 which supports the mirror 19. The side wall 27 is cut away at its upper portion 27' for a distance extending from the rear edge to its center, and likewise the wall 28 is cut away at 28' from the front edge back to the central plane. The front wall 17 is cut away or notched at 17' at the left end of its top and the vertical portion of the rear wall is notched at 29' at the top diagonally opposite from the notch 17'. The notches 17' and 29' are shorter in horizontal dimension than the cut aways or notches 27' and 28'.

In the top of the inner frame and adjacent to each corner there is provided a fixed plate. Two of these plates are indicated at 30, diagonally opposite each other, and the other two are indicated at 31 likewise diagonally opposite each other and adjacent to the notched out upper edge portions of the side walls. Each of these plates is preferably square and of a diameter approximately one-fifth of that of the large open square at the top of the frame. The two plates 30 lie in the same horizontal plane while the other two plates 31 lie in the same horizontal plane slightly below that of the other two plates or at an interval of about the thickness of the relatively thin material from which these plates are made.

Figure 8:
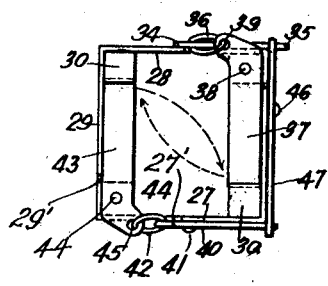
Fig. 8 is a plan view with the parts in the position indicated in Fig. 7.

On the left wall 28 there is pivoted at 33 a bell crank lever 34, one arm of which projects forward at 35 ahead of the front wall 17, while the upper arm of the bell crank has loose link connection at 36 with a movable plate 37 pivoted at 38 upon one of the fixed plates 31. The loose link connection 36 is had with the plate 37 through an eye 39. The main portion of this plate 37 is adapted to span the space between the fixed plate 31 to which it is pivoted and either of the plates 30, as will be noted in comparing Figs. 6 and 8. Consequently the width of the movable plate 37 is preferably equal to the diameter of the plates 30. On the opposite wall 27 is pivoted a bell crank 40 on a pivot 41, one arm of the bell crank extending forward past the plane of the front wall 17 but not quite so far as the end 35 of the bell crank 34. The upper arm of the bell crank 40 has loose link connection 42 with a movable plate 43 pivoted at 44 upon the fixed plate 31 diagonally opposite from the one to which the plate 37 is pivoted. The link 42 is connected in an eye 45 of the plate 43.

Figure 9:
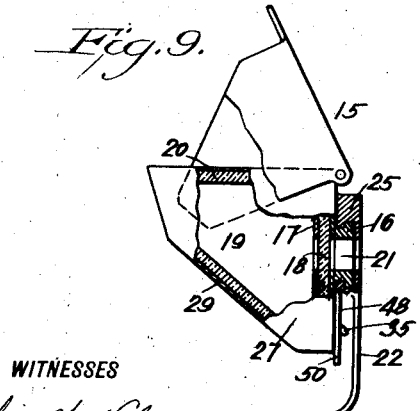
Fig. 9 is a partial side elevation and a partial vertical section on the line 9—9 of Fig. 2.
Figure 10:
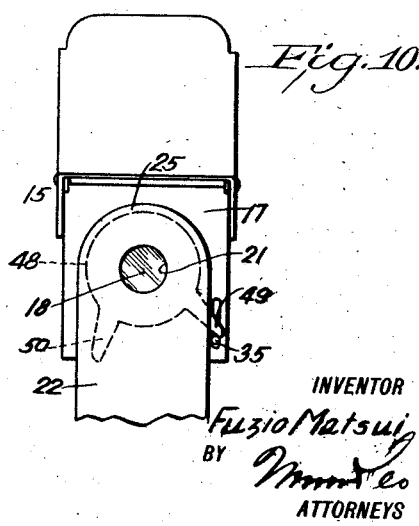
Fig. 10 is a front elevation of the same showing particularly the relation of the actuator connected to the supporting bracket for the finder to the movable parts within the finder.

Pivoted on the front wall 17 at 46 is a lever 47 having forked ends in which the front ends of the bell cranks 34 and 40 are located. The point or end 35 of the bell crank 34 extends far enough forward to be actuated by an actuator portion 48 fixed to the bracket 22 and lying in a plane parallel thereto between the main portion of the bracket and the front wall 17 of the finder. This actuator is in the nature of a disk having fingers 49 and 50. See Figs. 9 and 10. While the finder is journaled upon the bracket for rotation through 90 degrees from one position to the other as shown in Figs. 1 and 2 the circumferential space between the two fingers 49 and 50 is slightly less than 90 degrees. The projecting end 35 of the bell crank 34 lies always between the two fingers 49 and 50 of the actuator and is so disposed with respect to the bracket that one of the fingers will strike against the projecting end 35 just prior to the completion of the adjustment of the finder and so during the last portion of such movement of the finder the finger coming into engagement with the end 35 will cause a quick angular movement of the bell crank 34 around its pivot 33 causing thereby the throwing of the movable plate 37 from the position of Fig. 6 to that of Fig. 8 or vice versa, depending upon the direction in which the finder is being moved. This movement of the bell crank 34 acts through the lever 47 to cause a movement of the bell crank 40 at the same time but in the opposite direction thereby causing a movement of the opposite movable plate 43 so as to occupy a position parallel to the plate 37, the points or free ends of the plates 37 and 43 being so caused to pass each other at about the center of the frame. These plates, however, being thin do not interfere with each other during such swinging movement around their pivots 38 and 44. This description of the actuation of the plates 37 and 43 is intended to cover the movement thereof in either direction, either into the position of Fig. 6 or that of Fig. 8, such movement being automatic in that the operator has but to move the finder in the usual manner so as to occupy the desired position as indicated either in Fig. 1 or Fig. 2 as will be well understood, and hence no attention is required on the part of the operator beyond this movement of the finder to effect the shifting of the open panel or sight between the two movable plates 37 and 43. This sight is always oblong by virtue of the small square fixed plates 30 which are always in alinement with the movable plates in either adjusted position.

The device is exceedingly simple in construction, reliable in operation, and in addition to the fact that it requires no attention on the part of the operator it is not likely to get out of order. The bell cranks 34 and 40 and the lever 47 are connected to the inner casing or shell that is substantially housed within the main or outer casing of the finder.

I claim:

1. The combination with a camera frame, a finder and a bracket to support the finder upon the camera frame, said bracket being fixed to one of the aforesaid parts and having vertical connection with the other, a pair of movable members arranged within the finder adjacent to the sight opening thereof and lying parallel to each other along opposite sides of said sight opening for the purpose of reducing the width in one direction of said sight opening, and connections between said movable members and said bracket whereby said movable members are automatically changed from one position to another position along opposite side edges of the sight opening coincidentally with the pivotal movement of the finder according to the position of the camera for taking a horizontal or a vertical picture.

2. The combination with a camera constructed to take an oblong picture either horizontal or vertical, a finder and bracket means pivotally supporting the finder upon the camera, said finder having a substantially square sight opening at its top in either adjustment of the camera, of a pair of movable members lying parallel to each other and along the upper and lower edges of said sight opening when the camera is arranged for a horizontal picture thus making the effective sight opening proportional in dimensions to the picture field in the camera, and means to automatically cause the movement of said movable members so as to occupy parallel positions along the right and left side edges of the sight opening of the finder when the camera is set for a vertical picture.

3. The herein described finder for photographic cameras, the same having a sight opening in its top portion, a pair of plates pivoted in diagonally opposite corners of said opening, the plates extending in opposite directions from their pivots and parallel to each other so as to reduce the width of the sight opening in the direction between the plates, and means to cause the swinging of said plates simultaneously in opposite directions around their pivots to cause them to lie parallel to each other along the other two sides of the sight opening.

4. In a finder for cameras, the combination of a frame having at one side a pivot head, a bracket pivoted to said head, the head and bracket having a peep hole, a lens fixed in the adjacent wall of the frame and registering with the peep hole, an actuator fixed to the bracket adjacent to and concentric with the axis of the pivot, the top of the finder having a rectangular sight opening against which the view through the peep hole and lens is thrown for observation, a pair of movable plates adjacent to the sight opening and arranged parallel to each other along opposite edges thereof to reduce the effective width of the sight opening, and devices connected to the movable members and coöperating with said actuator to cause the movement of both movable plates simultaneously so as to occupy parallel positions along the two other sides of the sight opening to reduce the width of the sight opening in the other direction coincidentally with the movement of the finder relatively around its pivotal connection with said bracket.

FUZIO MATSUI.